(12) United States Patent
Cho et al.

(10) Patent No.: US 8,895,677 B2
(45) Date of Patent: Nov. 25, 2014

(54) POLYAMIDE BLOCK COPOLYMER, ARTICLE INCLUDING SAME, AND DISPLAY DEVICE INCLUDING THE ARTICLE

(75) Inventors: Chung Kun Cho, Suwon-si (KR); Kalinina Fedosya, Suwon-si (KR); Kovalev Mikhail, Suwon-si (KR); Sang Mock Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 104 days.

(21) Appl. No.: 13/364,062

(22) Filed: Feb. 1, 2012

(65) Prior Publication Data

US 2012/0296037 A1 Nov. 22, 2012

(30) Foreign Application Priority Data

May 19, 2011 (KR) .................. 10 2011 0047491

(51) Int. Cl.
| | | |
|---|---|---|
| C08L 77/00 | (2006.01) | |
| C08G 69/32 | (2006.01) | |
| C08G 69/26 | (2006.01) | |
| C09J 177/10 | (2006.01) | |
| D01F 6/80 | (2006.01) | |
| C08G 69/28 | (2006.01) | |
| C08L 77/10 | (2006.01) | |
| C08J 5/18 | (2006.01) | |
| C08G 69/42 | (2006.01) | |
| C09D 177/10 | (2006.01) | |

(52) U.S. Cl.
CPC ............ C08G 69/32 (2013.01); C08G 69/265 (2013.01); C09J 177/10 (2013.01); D01F 6/805 (2013.01); C08G 69/28 (2013.01); *C08J 2377/10* (2013.01); C08L 77/10 (2013.01); C08J 5/18 (2013.01); C08G 69/42 (2013.01); *C09D 177/10* (2013.01)
USPC ............ 525/432; 525/420; 528/335; 528/337; 528/338; 528/340

(58) Field of Classification Search
USPC ............ 525/420, 432; 528/335, 337, 338, 340
See application file for complete search history.

(56) References Cited

U.S. PATENT DOCUMENTS

| | | | |
|---|---|---|---|
| 5,637,653 A | 6/1997 | Preston et al. | |
| 2002/0142179 A1 | 10/2002 | Nanba et al. | |
| 2005/0288451 A1 | 12/2005 | Liedloff et al. | |
| 2006/0106193 A1 | 5/2006 | Moriyama et al. | |
| 2007/0050812 A1 | 3/2007 | Ebata et al. | |
| 2007/0160806 A1 | 7/2007 | Nakamura | |
| 2008/0261010 A1 | 10/2008 | Wursche et al. | |
| 2009/0023002 A1 | 1/2009 | Nanba | |
| 2009/0163634 A1 | 6/2009 | Buhler et al. | |
| 2009/0286096 A1 | 11/2009 | Alting et al. | |
| 2009/0324884 A1 | 12/2009 | Nishi et al. | |
| 2010/0063223 A1 | 3/2010 | Weber et al. | |

FOREIGN PATENT DOCUMENTS

| | | |
|---|---|---|
| EP | 0315993 A1 | 5/1989 |
| JP | 2004-352833 A | 12/2004 |
| JP | 2005-22312 A | 1/2005 |
| JP | 2005-212389 A | 8/2005 |
| JP | 2007-058610 A | 3/2007 |
| JP | 2008-208248 A | 9/2008 |
| JP | 2009-79210 A | 6/2009 |
| JP | 2009-149896 A | 7/2009 |
| KR | 1019950018293 A | 7/1995 |
| KR | 1020020064214 A | 8/2002 |
| KR | 1020060049211 A | 5/2006 |
| KR | 1020060078280 A | 7/2006 |
| KR | 1020070051276 A | 5/2007 |
| KR | 1020070070321 A | 7/2007 |
| KR | 1020070104606 A | 10/2007 |
| KR | 1020080022113 A | 3/2008 |
| KR | 1020090125744 A | 12/2009 |

*Primary Examiner* — Ana Woodward
(74) *Attorney, Agent, or Firm* — Cantor Colburn LLP (57) ABSTRACT

A polyamide block copolymer that includes a first segment including a repeating unit represented by Chemical Formula 1, a repeating unit represented by Chemical Formula 2, or a combination thereof; and a second segment including a repeating unit represented by Chemical Formula 3. The variables $R^1$ to $R^{15}$, and n1 to n8 are defined herein.

Chemical Formula 1

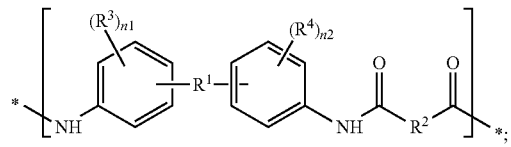

Chemical Formula 2

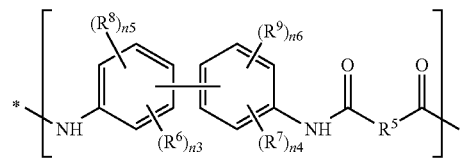

Chemical Formula 3

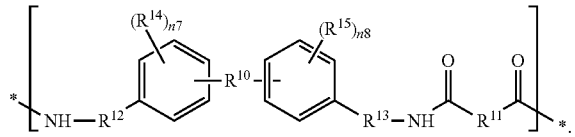

13 Claims, 2 Drawing Sheets

POLYAMIDE BLOCK COPOLYMER, ARTICLE INCLUDING SAME, AND DISPLAY DEVICE INCLUDING THE ARTICLE

CROSS-REFERENCE TO RELATED APPLICATION

This application claims priority to and the benefit of Korean Patent Application No. 10-2011-0047491 filed on May 19, 2011, and all the benefits accruing therefrom under 35 U.S.C. §119, the content of which in its entirety is herein incorporated by reference.

BACKGROUND

1. Field

This disclosure relates to a polyamide block copolymer, an article including the same, and a display device including the article.

2. Description of the Related Art

A colorless transparent material has been developed for use in diverse applications such as an optical lens, a functional optical film, and a disk substrate, but as information devices are being further miniaturized and display devices are providing higher resolution, more functions and greater performance are required from the material.

Therefore, there remains a need for a colorless transparent material having improved transparency, heat resistance, mechanical strength, and flexibility.

BRIEF SUMMARY OF THE INVENTION

An embodiment of this disclosure provides a polyamide block copolymer having improved transparency, heat resistance, mechanical strength, and flexibility.

Another embodiment of this disclosure provides an article including the polyamide block copolymer.

Yet another embodiment of this disclosure provides a display device including the article.

According to an embodiment, a polyamide block copolymer is provided that includes a first segment including a repeating unit represented by the following Chemical Formula 1, a repeating unit represented by the following Chemical Formula 2, or a combination thereof; and a second segment not identical to the first segment including a repeating unit represented by the following Chemical Formula 3.

Chemical Formula 1

In Chemical Formula 1, $R^1$ is the same or different in each repeating unit and each is independently a substituted or unsubstituted C3 to C30 alicyclic organic group, a substituted or unsubstituted C6 to C30 aromatic organic group, a substituted or unsubstituted C2 to C30 heterocyclic group, or a substituted or unsubstituted C2 to C30 heterocyclic group fused to a C6 to C30 aryl group;

$R^2$ is the same or different in each repeating unit and each is independently a substituted or unsubstituted C6 to C30 aromatic organic group, or a multi-ring system comprising at least two substituted or unsubstituted C6 to C30 arylene groups attached via a substituted or unsubstituted C1 to C10 aliphatic group;

$R^3$ and $R^4$ are the same or different and are each independently hydrogen, a halogen, a hydroxyl group, an ether group —$OR^{200}$, wherein $R^{200}$ is a C1 to C10 aliphatic organic group, a silyl group —$SiR^{201}R^{202}R^{203}$, $R^{201}$, $R^{202}$, and $R^{203}$ are the same or different and are each independently hydrogen or a C1 to C10 aliphatic organic group, a substituted or unsubstituted C1 to C10 aliphatic organic group, or a C6 to C20 aryl group;

n1 and n2 are each independently integers ranging from 0 to 4; and

"*" represents a point of attachment to a subsequent repeating unit.

Chemical Formula 2

In Chemical Formula 2, $R^5$ is the same or different in each repeating unit and each is independently a substituted or unsubstituted C6 to C30 aromatic organic group, or a multi-ring system comprising at least two substituted or unsubstituted C6 to C30 arylene groups attached via a substituted or unsubstituted C1 to C10 aliphatic group;

$R^6$ and $R^7$ are the same or different and are each independently an electron withdrawing group;

$R^8$ and $R^9$ are the same or different and are each independently hydrogen, a halogen, a hydroxyl group, an ether group —$OR^{204}$, wherein $R^{204}$ is a C1 to C10 aliphatic organic group, a silyl group —$SiR^{205}R^{206}R^{207}$, wherein $R^{205}$, $R^{206}$, and $R^{207}$ are the same or different and are each independently hydrogen or a C1 to C10 aliphatic organic group, a substituted or unsubstituted C1 to C10 aliphatic organic group, or a C6 to C20 aromatic organic group;

n3 is an integer ranging from 1 to 4; n5 is an integer ranging from 0 to 4 the sum of n3 and n5 is an integer of 4 or less;

n4 is an integer ranging from 1 to 4; n6 is an integer ranging from 0 to 4; the sum of n4 and n6 is an integer of 4 or less; and "*" represents a point of attachment to a subsequent repeating unit.

Chemical Formula 3

In Chemical Formula 3, $R^{10}$ is the same or different in each repeating unit and each is independently a silicon-containing group, a phosphorus-containing group, a sulfur-containing group, a halogen substituted C1 to C10 aliphatic organic group, a C1 to C2 haloalkyl substituted C1 to C10 aliphatic group, or an ether bond (—O—)-containing group;

$R^{11}$ is the same or different in each repeating unit and each independently includes a substituted or unsubstituted C6 to C30 aromatic organic group, or a multi-ring system comprising at least two substituted or unsubstituted C6 to C30 arylene groups attached via a substituted or unsubstituted C1 to C10 aliphatic group;

$R^{12}$ and $R^{13}$ are the same or different and are each independently a single bond, a substituted or unsubstituted C6 to C20 aromatic organic group, a substituted or unsubstituted C6 to C20 aryleneoxy group, or a substituted or unsubstituted C6 to C20 arylene group linked via a C1 to C2 haloalkyl substituted C1 to C10 aliphatic group;

$R^{14}$ and $R^{15}$ are the same or different and are each independently hydrogen, a halogen, a hydroxyl group, an ether group —$OR^{208}$, wherein $R^{208}$ is a C1 to C10 aliphatic organic group, a silyl group —$SiR^{209}R^{210}R^{211}$, wherein $R^{209}$, $R^{210}$, and $R^{211}$ are the same or different and are each independently hydrogen or a C1 to C10 aliphatic organic group, a substituted or unsubstituted C1 to C10 aliphatic organic group, or a C6 to C20 aromatic organic group;

n7 and n8 are each independently integers ranging from 0 to 4; and

"*" represents a point of attachment to a subsequent repeating unit.

In Chemical Formula 1, the $R^1$ may be selected from the following chemical formulas, wherein "*" represents the point of attachment to each phenyl ring on either side of $R^1$:

In Chemical Formula 2, $R^6$ and $R^7$ are the same or different and are each independently a halogen, a nitro group, a cyano group, a C1 to C2 haloalkyl group, a C1 to C6 alkanoyl group, or a C1 to C6 alkylester group.

In Chemical Formula 2, $R^6$ and $R^7$ are the same or different and are each independently —$CF_3$, —$CCl_3$, —$CBr_3$, —F, —Cl, —Br, —I, —$NO_2$, —CN, —$COCH_3$, or —$CO_2C_2H_5$.

In Chemical Formula 3, $R^{10}$ is —$SO_2$—, —O—, —$C(CF_3)_2$—, —$C(CCl_3)_2$—, —$C(CBr_3)_2$—, —$CF_2$—, $CCl_2$—, or —$CBr_2$—.

In Chemical Formula 3, $R^{12}$ and $R^{13}$ are the same or different and are each independently a single bond, -Ph-, —O-Ph-, or —$C(CF_3)$—$_2$-Ph-, wherein Ph is a phenylene group.

In Chemical Formulas 1 to 3, $R^2$, $R^5$, and $R^{11}$ are the same or different and are each independently selected from the following chemical formulas.

In the above chemical formulas, $R^{16}$ to $R^{27}$ are the same or different and are each independently hydrogen, deuterium, a halogen, a substituted or unsubstituted C1 to C10 aliphatic organic group, a substituted or unsubstituted C6 to C20 aromatic organic group, or a C1 to C2 haloalkyl group;

n9 and n12 to n18 are each independently integers ranging from 0 to 4; and n10 and n11 are each independently integers ranging from 0 to 3.

Particularly, $R^2$, $R^5$, and $R^{11}$ are the same or different and are each independently selected from the following chemical formulas.

-continued

In the polyamide block copolymer, the first segments are the same or different and each independently includes 1 to about 100 repeating units of the repeating unit represented by Chemical Formula 1, the repeating unit represented by Chemical Formula 2, or a combination thereof.

According to an embodiment, the first segment may further include a repeating unit represented by the above Chemical Formula 3.

In particular, the first segment may include a repeating unit represented by the above Chemical Formula 3 in an amount of about 60 mole % or less based on the entire amount of all the repeating units included in the first segment.

The first segment may have a weight average molecular weight of about 500 grams per mole ("g/mol") to about 50,000 g/mol.

In the polyamide block copolymer, the second segments are the same or different, are not identical to the first segment, and may each independently include about 1 to about 100 repeating units of the repeating unit represented by Chemical Formula 3.

According to an embodiment, the second segment may further include a repeating unit represented by the above Chemical Formula 1, a repeating unit represented by the above Chemical Formula 2, or a combination thereof. According to an embodiment, the second segment may include a repeating unit represented by the above Chemical Formula 3 in an amount of more than about 60 mole % based on the entire amount of all the repeating units included in the second segment.

The second segment may have a weight average molecular weight ("Mw") of about 500 g/mol to about 50,000 g/mol.

The polyamide block copolymer may include the first segment and the second segment in a weight ratio ranging from about 1:99 to about 60:40. In particular, the polyamide block copolymer may include the first segment and the second segment in a weight ratio ranging from about 10:90 to about 40:60.

The polyamide block copolymer may have transmittance of about 80% or more of light at a wavelength ranging from about 400 nanometers ("nm") to about 750 nm.

The polyamide block copolymer may have transmittance of about 60% or more of light at a wavelength of about 400 nm.

According to another embodiment of this disclosure, an article including the polyamide block copolymer is provided.

The article may be a film, a fiber, a coating material, or an adhesive.

The article may have a coefficient of thermal expansion of about 35 parts per million per degrees Celsius ("ppm/° C.") or lower.

According to yet another embodiment of this disclosure, a display device including the article including the polyamide block copolymer is provided.

BRIEF DESCRIPTION OF THE DRAWINGS

The above and other aspects, advantages and features of this disclosure will become more apparent by describing in further detail embodiments thereof with reference to the accompanying drawings in which.

DETAILED DESCRIPTION

This disclosure will be described more fully hereinafter with reference to the accompanying drawings, in which various embodiments are shown. This disclosure may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting. As used here, the singular forms "a", "an" and "the" are intended to include the plural forms as well, unless the content clearly indicates otherwise. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning consistent with their meaning in the context of the relevant art and the present disclosure, and will not be interpreted in an idealized or overly formal sense unless expressly so defined herein.

As used herein, when a specific definition is not otherwise provided, the term "substituted" refers to one substituted with at least one substituent including a halogen (F, Br, Cl, or I), a hydroxyl group, a nitro group, a cyano group, an amino group ($NH_2$, $NH(R^{100})$, or $N(R^{101})(R^{102})$, wherein $R^{100}$, $R^{101}$, and $R^{102}$ are the same or different, and are each independently a C1 to C10 alkyl group), an amidino group, a hydrazine group, a hydrazone group, a carboxyl group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, or a substituted or unsubstituted heterocyclic group, in place of at least one hydrogen of a functional group.

As used herein, when a specific definition is not otherwise provided, the term "alkyl group" refers to a straight or branched chain saturated aliphatic hydrocarbyl group having the specified number of carbon atoms, a valence of one, and optionally substituted with one or more substituents where indicated. An alkyl group includes a C1 to C30 alkyl group, and specifically a C1 to C15 alkyl group.

The term "cycloalkyl group" refers to a hydrocarbyl group having one or more saturated rings in which all ring members are carbon, the specified number of carbon atoms, a valence of one, and optionally substituted with one or more substituents where indicated. Non-limiting examples include cyclopropyl, cyclobutyl, cyclopentyl, cyclohexyl, cycloheptyl, cyclooctyl, and adamantly groups. A cycloalkyl group includes a C3 to C30 cycloalkyl group, and specifically a C3 to C18 cycloalkyl group. A "cycloalkenyl" group is a cylcoalkyl group having at least one carbon-carbon double bond in the ring, and a "cycloalkynyl" group is a cycloalkyl group having at least one carbon-carbon triple bond in the ring. Cycloalkyl, cycloalkenyl, and cycloalkynyl groups do not contain an aromatic ring or a heterocyclic ring.

The term "alkoxy group" refers to an alkyl group as defined above, linked via an oxygen. An alkoxy group includes a C1 to C30 alkoxy group, and specifically a C1 to C18 alkoxy group.

The term "aryl group" refers to a carbocyclic ring system that includes one or more aromatic rings in which all ring members are carbon, having the specified number of carbon atoms, a valence of one, and optionally substituted with one or more substituents where indicated. More than one ring may be present, and any additional rings may be independently aromatic, saturated, or partially unsaturated and multiple rings, if present, may be fused, pendent, spirocyclic or a combination thereof. Non-limiting examples include phenyl, naphthyl, and tetrahydronaphthyl groups. An aryl group includes a C6 to C30 aryl group, and specifically a C6 to C18 aryl group.

The term "alkenyl group" refers to a straight or branched chain hydrocarbyl group having the specified number of carbon atoms, a valence of one, at least one carbon-carbon double bond, and optionally substituted with one or more substituents where indicated. An alkenyl group includes a C2 to C30 alkenyl group, and specifically a C2 to C18 alkenyl group.

The term "alkynyl group" refers to a straight or branched chain hydrocarbon having the specified number of carbon atoms a valence of one, at least one carbon-carbon triple bond, and optionally substituted with one or more substituents where indicated. An alkynyl group includes a C2 to C30 alkynyl group, and specifically a C2 to C18 alkynyl group.

The term "alkylene group" refers to an alkyl group having the specified number of carbon atoms, a valence of two or higher, and optionally substituted with one or more substituents where indicated. An alkylene group includes a C1 to C30 alkylene group, and specifically a C1 to C18 alkylene group.

The term "cycloalkylene group" refers to a cycloalkyl group having one or more saturated rings in which all ring members are carbon, the specified number of carbon atoms, a valence of two or higher, and optionally substituted with one or more substituents where indicated.

An "alkenylene" group is an alkenyl group having the specified number of carbon atoms, a valence of two or higher, and optionally substituted with one or more substituents where indicated.

The term "arylene group" refers to an aryl group having the specified number of carbon atoms, and a valence of two or higher wherein the points of attachment may be on the same or different rings, each of which rings may be aromatic or nonaromatic, and optionally substituted with one or more substituents where indicated. Non-limiting examples include phenylene and naphthylene. An arylene group includes a C6 to C30 arylene group, and specifically a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group.

The term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group. An alicyclic organic group can mono-, bi-, or polycyclic, and can be optionally bridged. More than one alicyclic ring may be present, and any additional rings may be independently saturated, or partially unsaturated and multiple rings, if present, may be fused, pendent, spirocyclic or a combination thereof. An aromatic group or heterocyclic group is not present.

The term "aromatic organic group" refers to a C6 to C30 aryl group or a C6 to C30 arylene group, specifically a C6 to C16 aryl group or a C6 to C16 arylene group.

The term "heterocyclic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or a C2 to C30 heteroarylene group, wherein 1 to 3 heteroatoms independently selected from O, S, N, P, Si, and a combination thereof and may be present as a ring member in one ring or multiple rings, specifically a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group including 1 to 3 heteroatoms selected from O, S, N, P, Si, and a combination thereof, in one ring.

An "alkanoyl" group is an alkyl group as defined above, attached through a keto (—(C=O)—) bridge. Alkanoyl groups have the indicated number of carbon atoms, with the carbon of the keto group being included in the numbered carbon atoms. For example a $C_2$alkanoyl group is an acetyl group having the formula $CH_3(C=O)$—.

An "alkylester" group is an alkyl group as defined above, attached through an ester linkage. The ester linkage may be in either orientation, e.g. a group of the formula —O(C=O) alkyl or a group of the formula —(C=O)O alkyl.

As used herein, when a definition is not otherwise provided, "combination" commonly refers to mixing or copolymerization.

In addition, the mark "*" refers to a point of attachment in a chemical formula.

According to an embodiment, a polyamide block copolymer is provided that includes a first segment including a repeating unit represented by the following Chemical Formula 1, a repeating unit represented by the following Chemical Formula 2, or a combination thereof; and a second segment not identical to the first segment including a repeating unit represented by the following Chemical Formula 3.

Chemical Formula 1

In Chemical Formula 1, $R^1$ is the same or different in each repeating unit and each is independently a substituted or unsubstituted C3 to C30 alicyclic organic group, a substituted or unsubstituted C6 to C30 aromatic organic group, a substituted or unsubstituted C2 to C30 heterocyclic group, a substituted or unsubstituted C2 to C30 heterocyclic group fused to a C6 to C30 aryl group. More specifically, $R^1$ is a substituted or unsubstituted C3 to C20 alicyclic organic group, still more specifically a C3 to C20 mono-, or bicycloalkenylene group optionally substituted with an oxo substituent and/or optionally bridged, a substituted or unsubstituted C6 to C20 aromatic organic group, a substituted or unsubstituted C2 to C20 heterocyclic group, a C2 to C20 heterocyclic group fused to a C6 to C20 aryl group, a multi-ring system comprising 2 to 4 saturated, partially unsaturated or unsaturated C3 to C20 carbocycle groups attached via a single bond, or a multi-ring system comprising 2 to 4 saturated, partially unsaturated or unsaturated C3 to C20 fused carbocycle groups. Still more specifically, $R^1$ is a fluorene.

$R^2$ is the same or different in each repeating unit and each is independently a substituted or unsubstituted C6 to C30 aromatic organic group, particularly a substituted or unsubstituted C6 to C20 aromatic organic group for example a C6 to C20 aromatic organic group optionally substituted with 0, 1, or more substituents independently chosen from hydrogen, deuterium, a halogen, a C1 to C6 alkanoyl group, a C1 to C10 alkyl group, and a C6 to C20 aryl group, or a multi-ring system comprising 2 to 4 C6 to C20 arylene groups attached via a C1 to C2 haloalkyl substituted C1 to C10 alkylene group.

$R^3$ and $R^4$ are the same or different and are each independently hydrogen, a halogen, a hydroxyl group, an ether group —$OR^{200}$, wherein $R^{200}$ is a C1 to C10 aliphatic organic group, a silyl group —$SiR^{201}R^{202}R^{203}$, wherein $R^{201}$, $R^{202}$, and $R^{203}$ are the same or different and are each independently hydrogen or a C1 to C10 aliphatic organic group, a substituted or unsubstituted C1 to C10 aliphatic organic group, or a C6 to C20 aryl group.

n1 and n2 are each independently integers ranging from 0 to 4; and "*" represents a point of attachment to a subsequent repeating unit of Chemical Formula 1.

A repeating unit represented by the above Chemical Formula 1 has a rigid structure and thus may improve heat resistance and mechanical strength of a polyamide block copolymer including the repeating unit.

Additionally, a polyamide block copolymer may be colored due to an intramolecular and/or intermolecular electron charge transfer complex. In Chemical Formula 1, $R^1$ has a cyclic structure which may suppress formation of a charge transfer complex, because an electron cloud of $R^1$ divides an electron cloud of a molecule chain. In addition, $R^1$ is a bulky group which may hinder formation of an intermolecular charge transfer complex. Accordingly, a polyamide block copolymer including a repeating unit represented by the above Chemical Formula 1 may have improved transparency.

Furthermore, $R^1$ may have a stable cyclic structure and thus may contribute to the improved heat resistance and mechanical strength of a polyamide block copolymer including a repeating unit represented by the above Chemical Formula 1.

In particular, the $R^1$ may be selected from the following chemical formulas, but is not limited thereto, wherein "*" represents the point of attachment to each phenyl ring on either side of $R^1$.

In the chemical formula, $R^2$ may also have a stable cyclic structure, due to the aromatic group and thus may also contribute to the improved heat resistance and mechanical strength of a polyamide block copolymer including a repeating unit represented by the above Chemical Formula 1.

Particularly, $R^2$ is the same or different in each repeating unit and each is independently selected from the following chemical formulas, but is not limited thereto.

-continued

In the above chemical formulas,

$R^{16}$ to $R^{27}$ are the same or different and are each independently hydrogen, deuterium, a halogen, a substituted or unsubstituted C1 to C10 aliphatic organic group, a substituted or unsubstituted C6 to C20 aryl group, or a C1 to C2 haloalkyl group.

n9 and n12 to n18 are each independently integers ranging from 0 to 4, and n10 and n11 are each independently integers ranging from 0 to 3.

More particularly, $R^2$ is the same or different in each repeating unit and each is independently selected from the following chemical formulas, but is not limited thereto.

Chemical Formula 2

In Chemical Formula 2, $R^5$ is the same or different in each repeating unit and each is independently a substituted or unsubstituted C6 to C30 aromatic organic group, or a multi-ring system comprising at least two substituted or unsubstituted C6 to C30 arylene groups attached via a substituted or unsubstituted C1 to C10 aliphatic group. More particularly $R^5$ is a substituted or unsubstituted C6 to C20 aromatic organic group optionally substituted with 0, 1, or more substituents independently chosen from hydrogen, deuterium, a halogen, a C1 to C6 alkanoyl group, a C1 to C10 alkyl group, and a C6 to C20 aryl group, or a multi-ring system comprising 2 to 4 C6 to C20 arylene groups attached via a C1 to C2 haloalkyl substituted C1 to C10 alkylene group.

$R^6$ and $R^7$ are the same or different and are each independently an electron withdrawing group.

$R^8$ and $R^9$ are the same or different and are each independently hydrogen, a halogen, a hydroxyl group, an ether group —$OR^{204}$, wherein $R^{204}$ is a C1 to C10 aliphatic organic group, a silyl group —$SiR^{205}R^{206}R^{207}$, wherein $R^{205}$, $R^{206}$, and $R^{207}$ are the same or different and are each independently hydrogen or a C1 to C10 aliphatic organic group, a substituted or unsubstituted C1 to C10 aliphatic organic group, or a C6 to C20 aryl group.

n3 is an integer ranging from 1 to 4; n5 is an integer ranging from 0 to 4; the sum of n3 and n5 is an integer of 4 or less;

n4 is an integer ranging from 1 to 4; n6 is an integer ranging from 0 to 4 the sum of n4 and n6 is an integer of 4 or less; and "*" represents a point of attachment to a subsequent repeating unit of Chemical Formula 2.

A repeating unit represented by the above Chemical Formula 2 has a rigid structure and thus may further contribute to the improved heat resistance and mechanical strength of a polyamide block copolymer including the repeating unit.

In the above Chemical Formula 2, $R^5$ may also have a stable cyclic structure, due to the aromatic group and thus may also contribute to the improved heat resistance and mechanical strength of a polyamide block copolymer including the repeating unit represented by the above Chemical Formula 2.

Examples of $R^5$ may be the same as the examples of $R^2$ of Chemical Formula 1.

In addition, a repeating unit represented by the above Chemical Formula 2 includes $R^6$ and $R^7$, electron-withdrawing groups, and thus may suppress formation of an intramolecular and/or intermolecular electron charge transfer complex and improve transparency of a polyamide block copolymer including the repeating unit represented by the above Chemical Formula 2. More particularly, $R^6$ and $R^7$ may each be independently a C1 to C2 haloalkyl group, a halogen, a nitro group, a cyano group, a C1 to C6 alkylester group; or a C1 to C6 alkanoyl group.

In particular, the $R^6$ and $R^7$ substituents are positive valued Hammett substituent constants, and in particular, may each be independently —$CF_3$, —F, —Cl, —Br, —I, —$NO_2$, —$COCH_3$, or —$CO_2C_2H_5$, and still more particularly, —$CF_3$, —$CCl_3$, —$NO_2$, or —CN.

Chemical Formula 3

In Chemical Formula 3, $R^{10}$ is the same or different in each repeating unit and each is independently a silicon-containing group, a phosphorus-containing group, a sulfur-containing group, a halogen substituted C1 to C10 aliphatic organic group, a C1 to C2 haloalkyl substituted C1 to C10 aliphatic group, or an ether bond (—O—)-containing group. More specifically, $R^{10}$ is —$SO_2$—, —O—, —$C(CF_3)_2$—, —$C(CCl_3)_2$—, —$C(CBr_3)_2$—, —$CF_2$—, $CCl_2$—, or —$CBr_2$—. Still more specifically, $R^{10}$ is —$SO_2$—.

$R^{11}$ is the same or different in each repeating unit and each independently includes a substituted or unsubstituted C6 to C30 aromatic organic group, or a multi-ring system comprising at least two substituted or unsubstituted C6 to C30 arylene groups attached via a substituted or unsubstituted C1 to C10 aliphatic group. More particularly, $R^{11}$ is a substituted or unsubstituted C6 to C20 aromatic organic group optionally substituted with 0, 1, or more substituents independently chosen from hydrogen, deuterium, a halogen, a C1 to C6 alkanoyl group, a C1 to C10 alkyl group, and a C6 to C20 aryl group, or a multi-ring system comprising 2 to 4 C6 to C20 arylene groups attached via a C1 to C2 haloalkyl substituted C1 to C10 alkylene group.

$R^{12}$ and $R^{13}$ are the same or different and are each independently a single bond, a substituted or unsubstituted C6 to C20 aromatic group, a substituted or unsubstituted C6 to C20 aryleneoxy group, or a substituted or unsubstituted C6 to C20 arylene group linked via a C1 to C2 haloalkyl substituted C1 to C10 aliphatic group.

$R^{14}$ and $R^{15}$ are the same or different and are each independently hydrogen, a halogen, a hydroxyl group, an ether group —$OR^{208}$, wherein $R^{208}$ is a C1 to C10 aliphatic organic group, a silyl group —$SiR^{209}R^{210}R^{211}$, wherein $R^{209}$, $R^{210}$, and $R^{211}$ are the same or different and are each independently hydrogen or, a C1 to C10 aliphatic organic group, a substituted or unsubstituted C1 to C10 aliphatic organic group, or a C6 to C20 aryl group. n7 and n8 are each independently integers ranging from 0 to 4; and "*" represents a point of attachment to a subsequent repeating unit.

A repeating unit represented by the above Chemical Formula 3 has a flexible structure and thus may improve elongation of a polyamide block copolymer including the repeating unit, and accordingly, flexibility of the polyamide block copolymer. In addition, when the polyamide block copolymer is formed into a film and elongated, crystal formation and generation of a white residue may be suppressed, and thus transparency of the polyamide block copolymer may be effectively maintained.

In the above Chemical Formula 3, $R^{10}$ includes a functional group that suppresses formation of an intramolecular and/or intermolecular charge transfer complex, and thus may improve transparency of a polyamide block copolymer including the repeating unit represented by the above Chemical Formula 3.

In particular, the $R^{10}$ functional group may include —$SO_2$—, —O—, —$C(CF_3)_2$—, —$C(CCl_3)_2$—, —$C(CBr_3)_2$—, —$CF_2$—, $CCl_2$—, or —$CBr_2$—, but is not limited thereto.

In the above Chemical Formula 3, $R^{11}$ may also have a stable cyclic structure, due to the aromatic organic group and thus may also contribute to the improved heat resistance and mechanical strength of a polyamide block copolymer including the repeating unit of Chemical Formula 3.

Examples of $R^{11}$ may be the same as examples of $R^2$ of Chemical Formula 1.

In particular, the $R^{12}$ and $R^{13}$ in the above Chemical Formula 3 are the same or different and each is independently a single bond, -Ph-, —O-Ph-, or —$C(CF_3)$—$_2$-Ph-, but is not limited thereto, wherein, Ph indicates a phenylene group.

Resultantly, a polyamide block copolymer according to an embodiment includes a first segment having a rigid structure and a second segment having a flexible structure, and thus may have improved transparency, heat resistance, mechanical strength, and flexibility.

Also, since the polyamide block copolymer according to an embodiment exists in the form of a block copolymer, the chemical structure may be easily controlled, and may result in a low coefficient of thermal expansion ("CTE").

In contrast, a polyamide random copolymer includes each monomer having different reactivities, and thus the chemical structure may be difficult to control. Accordingly, the polyamide random copolymer may have a high coefficient of thermal expansion ("CTE"). A polyamide graft copolymer may be difficult to prepare and may have poor workability due to viscosity and the like.

Therefore, the polyamide block copolymer may be used as a material for diverse articles, for example, a film requiring transparency. For example, the polyamide block copolymer may be useful for a variety of applications, such as a substrate for a display device, a touch panel, and a protective film for an optical disk.

The first segments may be the same or different and each independently include about 1 to about 100 repeating units of the repeating unit represented by the above Chemical Formula 1, the repeating unit represented by the above Chemical Formula 2, or a combination thereof. When each first segment includes a total number of repeating units within the range of repeating units noted above, the first segment may contribute to a low coefficient of thermal expansion ("CTE") of the polyamide block copolymer. In particular, the first segments may be the same or different and each independently includes about 1 to about 20 repeating units of the repeating unit represented by the above Chemical Formula 1, the repeating unit represented by the above Chemical Formula 2, or combination thereof.

The first segment may further include a repeating unit represented by the above Chemical Formula 3, and the repeating unit represented by the above Chemical Formula 3 may be included in an amount of about 60 mole % or less based on the entire amount of all the repeating units included in the first segment. When the first segment includes a repeating unit of Chemical Formula 3 within the mole percent range, phase separation may be effectively prevented or weakened. In addition, a polyamide block copolymer including the first segment may have improved heat resistance, mechanical strength, and flexibility.

The first segment may have a weight average molecular weight ("Mw") ranging from about 500 grams per mole ("g/mol") to about 50,000 g/mol. When the first segment has a weight average molecular weight within the range, mechanical strength may be effectively improved. In particular, the first segment may have a weight average molecular weight ("Mw") ranging from about 5000 g/mol to about 20,000 g/mol.

The second segments are the same or different, are not identical to the first segment, and each may independently include about 1 to about 100 repeating units of the repeating unit represented by the above Chemical Formula 3. When each second segment includes a total number of repeating units within the range of repeating units noted above, the second segment may further contribute to a low coefficient of thermal expansion ("CTE") of the polyamide block copolymer. In particular, the second segments may be the same or different, are not identical to the first segment, and each may independently include about 1 to about 20 repeating units of the repeating units represented by the above Chemical Formula 3.

The second segment may further include a repeating unit represented by the above Chemical Formula 1, a repeating unit represented by the above Chemical Formula 2, or a combination thereof. A repeating unit represented by the above Chemical Formula 3 may be included in an amount of more than about 60 mole % based on the entire amount of the repeating units included in the second segment. Accordingly, phase separation of a polyamide block copolymer including the second segment may be effectively prevented or weakened. In addition, a polyamide block copolymer including the second segment may have improved flexibility, heat resistance and mechanical strength.

The second segment may have a weight average molecular weight ("Mw") ranging from about 500 g/mol to about 50,000 g/mol. When the second segment has a weight average molecular weight within the weight average molecular weight range noted above, the second segment may contribute to a low coefficient of thermal expansion ("CTE") of the polyamide block copolymer. In particular, the second segment may have a weight average molecular weight ("Mw") ranging from about 5000 g/mol to about 20,000 g/mol.

The polyamide block copolymer may include the first segment and the second segment in a weight ratio ranging from about 1:99 to about 60:40. When the polyamide block copolymer includes the first segment and the second segment within the range, the first and second segments may be easily copolymerized and thus may prevent or weaken phase separation of the polyamide block copolymer and improve its transparency. In addition, the polyamide block copolymer may have improved heat resistance and mechanical strength resulting from the first segment and improved flexibility resulting from the second segment. Furthermore, less of the more costly first segment may be included in the polyamide block copolymer, reducing overall manufacturing costs of the polyamide block copolymer. In particular, the polyamide block copolymer may include the first segment and the second segment in a weight ratio ranging from about 10:90 to about 40:60, and more particularly, from about 10:90 to about 30:70.

The polyamide block copolymer may have transmittance of about 80% or more of light at a wavelength ranging from about 400 nanometers to about 750 nanometers, and in particular, about 60% or more of a light at a wavelength of about 400 nm. When the polyamide block copolymer has light transmittance within the wavelength range noted above, the polyamide block copolymer may be fabricated into a film used for example, in a field requiring transparency, and may also have excellent color reproducibility. In particular, the polyamide block copolymer may have transmittance ranging from about 80% to about 95% of light at a wavelength ranging from about 400 nm to about 750 nm, and transmittance ranging from about 60% to about 90% of light at a wavelength of about 400 nm.

Hereafter, a method for preparing the polyamide block copolymer is described.

The method for preparing the polyamide block copolymer includes: preparing a first segment including the repeating unit represented by Chemical Formula 1, the repeating unit represented by Chemical Formula 2, or a combination thereof; preparing a second segment not identical to the first segment including the repeating unit represented by Chemical Formula 3; and copolymerizing the first segment and the second segment.

Unless mentioned otherwise, the repeating unit represented by Chemical Formula 1, the repeating unit represented by Chemical Formula 2, the first segment, the repeating unit represented by Chemical Formula 3, the second segment, and the polyamide block copolymer are as described above.

The first segment and second segment may be prepared using for example, a low-temperature solution polymerization method, an interface polymerization method, a fusion polymerization method, and a solid-phase polymerization method, but is not limited thereto.

According to an embodiment a low-temperature solution polymerization method for preparing the first segment and second segment is described. According to the low-temperature solution polymerization method, an amide segment is prepared by polymerizing a dicarboxylic acid dichloride and a diamine in an aprotic polar solvent.

The aprotic polar solvent may include a sulfoxide-based solvent such as dimethylsulfoxide and diethylsulfoxide; a formamide-based solvent such as N,N-dimethyl formamide and N,N-diethylformamide; an acetamide-based solvent such as N,N-dimethyl acetamide and N,N-diethylacetamide; a pyrrolidone-based solvent such as N-methyl-2-pyrrolidone and N-vinyl-2-pyrrolidone; a phenol-based solvent such as phenol, o-cresol, m-cresol, p-cresol, xylenol, a halogen substituted phenol, and catechol; hexamethylphosphoramide; γ-butyrolactone; or a mixture thereof. However, this disclosure is not limited to an aprotic polar solvent, and an aromatic hydrocarbon solvent such as xylene or toluene may be used. Also, to promote the dissolution of the copolymer, an alkali metal salt or an alkaline earth metal salt may be further added to the solvent in an amount of about 50 weight % or less based on the total amount of the solvent.

The first segment and second segment may each be independently prepared in the aprotic polar solvent by mixing and reacting a diamine selected from 4,4'-(9-fluorenylidene)dianiline ("BAPF"), 2,2'-bis(trifluoromethyl)benzidine ("TFDB"), 4,4'-diaminodiphenyl sulfone ("DADPS"), bis[4-(4-aminophenoxy)phenyl]sulfone ("BAPS"), and a combination thereof; and a dicarboxylic acid dichloride selected from terephthaloyl chloride ("TPCl"), isophthaloyl chloride ("IPCl"), naphthalene dicarbonyl chloride, biphenyl dicarbonyl chloride ("BPCl"), terphenyl dicarbonyl chloride, 2-fluoro-terephthaloyl chloride, and a combination thereof. According to an embodiment, the kind and amount of the diamine and the dicarboxylic acid dichloride may be appropriately selected according to a desired composition of the polyamide block copolymer comprising the first segment and the second segment.

Meanwhile, when the first segment and second segment are prepared and more diamine is used than the dicarboxylic acid dichloride, each terminal end of the first segment and second segment may include an amine group.

Subsequently, a polyamide block copolymer may be prepared by mixing and copolymerizing the first segment, including an amine group at both terminal ends, and the second segment, including an amine group at both terminal ends; with a dicarboxylic acid dichloride selected from terephthaloyl chloride ("TPCl"), isophthaloyl chloride ("IPCl"), naphthalene dicarbonyl chloride, biphenyl dicarbonyl chloride, terphenyl dicarbonyl chloride, 2-fluoro-terephthaloyl chloride, and a combination thereof. According to an embodiment, the kinds and amounts of the first segment, the second segment, and the dicarboxylic acid dichloride may be appropriately selected and used according to a desired composition of the above-described polyamide block copolymer. Particularly, the copolymerization may be performed through a low-temperature solution polymerization method, but this disclosure is not limited thereto.

According to another embodiment, an article including the polyamide block copolymer is provided.

The article may be film, a fiber, a coating material, or an adhesive material, but is not limited thereto.

The article including the polyamide block copolymer may be prepared using a dry-wet method, a dry method, or a wet method, but this disclosure is not limited thereto.

When an article such as a film is manufactured using the polyamide block copolymer through the dry-wet method, a layer is formed by extruding the polyamide block copolymer from a mouth piece on a supporter such as a drum or endless belt, drying the layer and evaporating the solvent out of the layer until the layer has a self maintenance property. The drying may be performed at about 25° C. to about 220° C. for about 1 hour or less. When the surface of the drum and/or the endless belt used for the drying process is flat, a layer with a flat surface is acquired. The layer obtained after the drying process, is delaminated from the supporter and inputted to a wet process, desalted and/or desolventized, and the manufacturing of the film is completed as the layer is elongated, dried, and/or heat treated.

The elongating conforms to a draw ratio, which may range from about 0.8 to about 8 in terms of surface ratio. According to one embodiment, it may range from about 1.3 to about 8. The term "surface ratio" as used herein, is defined as a value obtained by dividing the area of a layer after the elongating by an area of the layer before the elongating, and a number of 1 or less denotes a relaxed state. Further, the elongating may be performed not only in a surface direction but also in a thickness direction.

The heat treatment may be performed at a temperature of about 200° C. to about 500° C., and particularly at about 250° C. to about 400° C. for about a few seconds to about a few minutes.

Also, the layer after elongating and heat treatment may be cooled slowly, particularly at a speed of about 50° C./second or lower.

The layer may be formed as a single layer, or as multiple layers.

The article including the polyamide block copolymer may have a coefficient of thermal expansion ("CTE") of about 35 parts per million per degrees Celsius ("ppm/° C.") or lower. When the coefficient of thermal expansion of the article is within the range, the article may have excellent heat resistance. Particularly, the article may have a coefficient of thermal expansion of about 10 ppm/° C. to about 30 ppm/° C., more particularly about 10 ppm/° C. to about 20 ppm/° C.

The article including the polyamide block copolymer may have haze of about 3% or lower. When the haze range of the article is within this range, the article may be sufficiently transparent to have excellent clarity. Particularly, the article may have haze of about 1.5% or lower.

The article including the polyamide block copolymer, for example a film, may have a thickness of about 0.01 micrometers ("μm") to about 1000 μm, but this disclosure is not limited thereto and the thickness may be adjusted according to the usage.

Since the article includes the polyamide block copolymer that has improved transparency, heat resistance, mechanical strength, and flexibility, the article may have improved transparency, heat resistance, mechanical strength, and flexibility as well. Therefore, the article may be used for diverse applications, such as a substrate for a device, a substrate for a display device, an optical film, an integrated circuit ("IC") package, an adhesive film, a multi-layer flexible printed circuit ("FRC"), tape, a touch panel, and a protective film for an optical disk.

Another embodiment provides a display device including the article. Particularly, the display device may include a liquid crystal display ("LCD"), an organic light emitting diode ("OLED"), and the like, but is not limited thereto.

Figure 1:
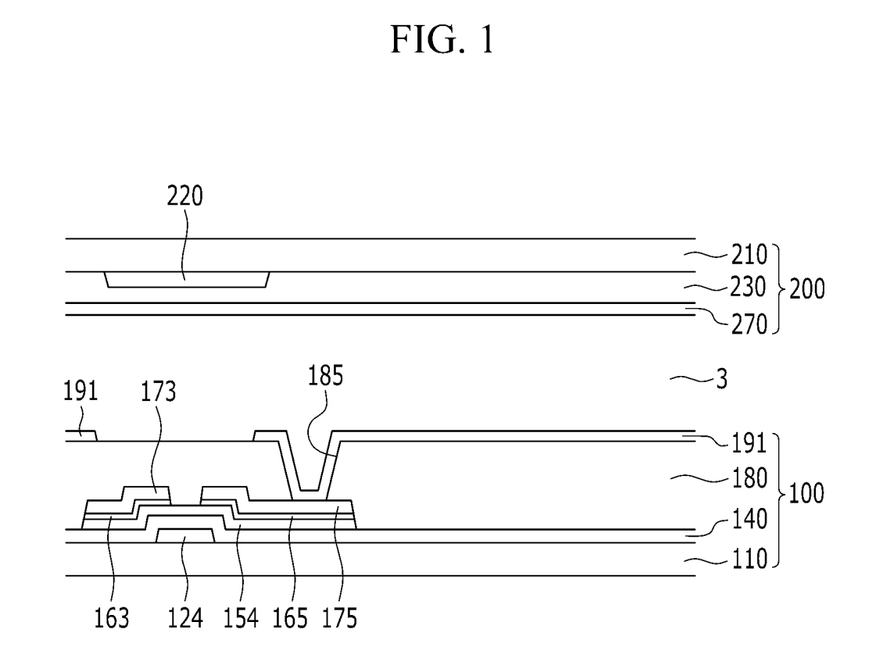
FIG. 1 is a cross-sectional view of a display device such as a liquid crystal display ("LCD") according to an embodiment.

According to an embodiment a display device, such as a liquid crystal display ("LCD") is described by referring to FIG. 1.

FIG. 1 is a cross-sectional view of a display device, such as a liquid crystal display ("LCD") according to an embodiment.

Referring to FIG. 1, the liquid crystal display ("LCD") includes a thin film transistor array panel 100, a common electrode panel 200 facing the thin film transistor array panel 100, and a liquid crystal layer 3 interposed between the two panels 100 and 200.

First, the thin film transistor array panel 100 will be described.

A gate electrode 124, a gate insulating layer 140, a semiconductor 154, a plurality of ohmic contacts 163 and 165, a source electrode 173, and a drain electrode 175 are sequentially disposed on a substrate 110. The source electrode 173 and the drain electrode 175 are isolated from each other and they face each other with the gate electrode 124 between them.

One gate electrode 124, one source electrode 173, and one drain electrode 175 constitute one thin film transistor ("TFT") together with the semiconductor 154, and a channel of the thin film transistor is formed in the semiconductor 154 between the source electrode 173 and the drain electrode 175.

A protective layer 180 is disposed on the gate insulating layer 140, the source electrode 173, and the drain electrode 175, and a contact hole 185 that exposes the drain electrode 175 is formed in the protective layer 180.

A pixel electrode 191 formed of a transparent conductive material such as indium tin oxide ("ITO") or indium zinc oxide ("IZO") is disposed on the protective layer 180. The pixel electrode 191 is connected to the drain electrode 175 through the contact hole 185.

The common electrode panel 200 will now be described.

In the common electrode panel 200, a light blocking member 220 referred to as a black matrix is disposed on a substrate 210, a color filter 230 is disposed on the substrate 210 and the light blocking member 220, and a common electrode 270 is formed on the color filter 230.

According to an embodiment, the substrates 110 and 210 may be articles including the polyamide block copolymer.

Figure 2:
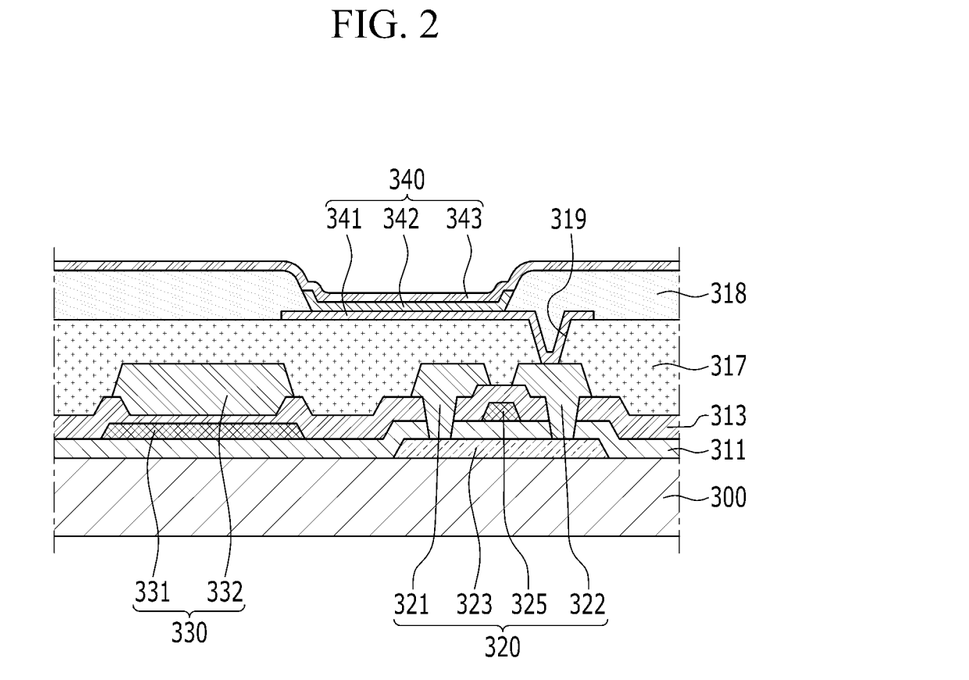
FIG. 2 is a cross-sectional view of another display device, an organic light emitting diode ("OLED") according to an embodiment.

According to another embodiment, display devices, such as an organic light emitting diode ("OLED") is described by referring to FIG. 2.

FIG. 2 is a cross-sectional view of an organic light emitting diode ("OLED") according to an embodiment.

Referring to FIG. 2, a thin film transistor 320, a capacitor 330 and an organic light emitting element 340 are formed on a substrate 300. The thin film transistor 320 includes a source electrode 321, a semiconductor layer 323, a gate electrode 325, and a drain electrode 322, and the capacitor 330 includes a first capacitor 331 and a second capacitor 332. The organic light emitting element 340 includes a pixel electrode 341, an intermediate layer 342 and an opposed electrode 343.

According to an embodiment, the semiconductor layer 323, a gate insulating layer 311, the first capacitor 331, the gate electrode 325, an interlayer insulating layer 313, the second capacitor 332, the source electrode 321, and the drain electrode 322 are formed on the substrate 300. The source electrode 321 and the drain electrode 322 are isolated from each other, and they face each other with the gate electrode 325 between them.

A planarization layer 317 is disposed on the interlayer insulating layer 313, the second capacitor 332, the source electrode 321, and the drain electrode 322. The planarization layer 317 includes a contact hole 319 that exposes the drain electrode 322.

The pixel electrode 341 formed of a transparent conductive material such as ITO or IZO is disposed on the planarization layer 317. The pixel electrode 341 is connected to the drain electrode 322 through the contact hole 319.

The intermediate layer 342 and the opposed electrode 343 are sequentially disposed on the pixel electrode 341.

A pixel defining layer 318 is formed in a portion where the pixel electrode 341, the intermediate layer 342, and the opposed electrode 343 are not formed on the planarization layer 317.

According to an embodiment, the substrate 300 may be formed into an article including the polyamide block copolymer.

EXAMPLES

Hereafter, the embodiments are illustrated in more detail with reference to examples and comparative examples. However, the following examples and comparative examples are for illustrative purposes only and are not intended to limit the scope of one or more embodiments.

Synthesis Example 1

Synthesis of a First Segment

About 0.006 moles of 4,4'-diaminodiphenyl sulfone ("DADPS"), about 0.006 moles of 2,2'-bis(trifluoromethyl) benzidine ("TFDB"), and about 0.006 moles of terephthaloyl chloride ("TPCl") are reacted in N,N-dimethyl acetamide ("DMAC") at about 5° C. for about 1 hour in a 500 milliliter ("mL") round-bottomed flask, obtaining a first segment. The obtained first segment has a weight average molecular weight of about 21,352 grams per mole ("g/mol").

Synthesis Examples 2 to 6

Synthesis of a First Segment

As shown in the following Table 1, a first segment is prepared according to the same method as Synthesis Example 1 except for changing the kind and amount of diamine and dicarboxylic acid dichloride.

TABLE 1

|  | Diamine (mole) | | | | Dicarboxylic acid Dichloride (mole) | | Kind of segment | Weight average molecular weight (g/mol) |
| --- | --- | --- | --- | --- | --- | --- | --- | --- |
|  | DADPS | BAPS | TFDB | BAPF | TPCl | IPCl |  |  |
| Synthesis Example 1 | 0.006 | — | 0.006 | — | 0.006 | — | First segment | 21,352 |
| Synthesis Example 2 | 0.006 | — | 0.006 | — | 0.010 | — | First segment | 40,395 |
| Synthesis Example 3 | 0.006 | — | 0.006 | — | 0.008 | — | First segment | 32,896 |
| Synthesis Example 4 | 0.004 | — | 0.006 | — | 0.005 | — | First segment | 23,563 |
| Synthesis Example 5 | 0.004 | — | 0.006 | — | 0.005 | — | First segment | 31,456 |
| Synthesis Example 6 | 0.006 | — | 0.004 | — | 0.005 | — | First segment | 25,354 |

Synthesis Example 7

Synthesis of a Second Segment

About 0.006 moles of 4,4'-diaminodiphenyl sulfone ("DADPS"), about 0.002 moles of 4,4'-(9-fluorenylidene) dianiline ("BAPF"), and 0.004 moles of isophthaloyl chloride ("IPCl") are reacted in N,N-dimethyl acetamide ("DMAC") at about 5° C. for about 1 hour in a 500 mL round-bottomed flask, obtaining a second segment. The second segment has a weight average molecular weight of about 13,505 g/mol.

Synthesis Examples 8 to 10

Synthesis of a Second Segment

As shown in the following Table 2, a second segment is prepared according to the same method as Synthesis Example 7 except for changing the kind and amount of diamine and dicarboxylic acid dichloride.

TABLE 2

| | Diamine (mole) | | | | Dicarboxylic acid Dichloride (mole) | | Kind of segment | Weight average molecular weight (g/mol) |
|---|---|---|---|---|---|---|---|---|
| | DADPS | BAPS | TFDB | BAPF | TPCl | IPCl | | |
| Synthesis Example 7 | 0.006 | — | — | 0.002 | — | 0.004 | Second segment | 13,505 |
| Synthesis Example 8 | 0.006 | — | — | 0.002 | — | 0.006 | Second segment | 20,454 |
| Synthesis Example 9 | 0.004 | 0.006 | — | — | — | 0.005 | Second segment | 23,546 |
| Synthesis Example 10 | 0.008 | 0.006 | — | — | 0.0035 | 0.0035 | Second segment | 30,456 |

Example 1

Preparation of a Polyamide Block Copolymer and Film

The first segment, including an amine group at both ends, according to Synthesis Example 1, is mixed with the second segment, including an amine group at both ends, according to Synthesis Example 7, and about 0.004 moles of terephthaloyl chloride ("TPCl") and about 0.006 moles of isophthaloyl chloride ("IPCl") are added thereto. The resulting mixture is copolymerized at about 5° C. for about 1 hour, obtaining a polyamide block copolymer.

The polyamide block copolymer is coated on a glass substrate and dried at about 65° C., 70° C., and 75° C. for about 20 minutes, respectively, and then at about 80° C. and 130° C. for about 30 minutes, respectively, obtaining a film. The film is elongated to become white at about 280° C. at a speed of about 1 percent per second ("%/sec") in one direction. The elongated film is annealed under a nitrogen atmosphere, at about 320° C. for about 7 minutes. The film is about 50 μm thick.

Example 2 to 4

Preparation of a Polyamide Block Copolymer and Film

As shown in the following Table 3, a polyamide block copolymer and a film are prepared according to the same method as Example 1 except for changing the kind and amount of the first segment and the second segment. The films according to Examples 2 to 4 are about 50 μm to about 60 μm thick.

TABLE 3

| | Kind of the first segment | Kind of the second segment | Dicarboxylic acid dichloride | | Transparency (phase separation) |
|---|---|---|---|---|---|
| | | | TPCl (mole) | IPCl (mole) | |
| Example 1 | Synthesis Example 1 | Synthesis Example 7 | 0.004 | 0.006 | Transparent (No phase separation) |

TABLE 3-continued

| | Kind of the first segment | Kind of the second segment | Dicarboxylic acid dichloride | | Transparency (phase separation) |
|---|---|---|---|---|---|
| | | | TPCl (mole) | IPCl (mole) | |
| Example 2 | Synthesis Example 2 | Synthesis Example 8 | — | 0.004 | Transparent (No phase separation) |
| Example 3 | Synthesis Example 3 | Synthesis Example 8 | 0.002 | 0.004 | Transparent (No phase separation) |
| Example 4 | Synthesis Example 4 | Synthesis Example 9 | 0.005 | 0.005 | Transparent (No phase separation) |

Comparative Example 1

Preparation of a Polyamide Random Copolymer and Film

About 0.006 moles of 4,4'-diaminodiphenyl sulfone ("DADPS"), about 0.003 moles of 2,2'-bis(trifluoromethyl) benzidine ("TFDB"), about 0.001 moles of 4,4'-(9-fluorenylidene)dianiline ("BAPF"), about 0.005 moles of terephthaloyl chloride ("TPCl"), and about 0.005 moles of isophthaloyl chloride ("IPCl") are reacted in N,N-dimethyl acetamide ("DMAC") at about 5° C. for about 1 hour in a 500 mL round-bottomed flask, obtaining a polyamide random copolymer.

The polyamide random copolymer is coated on a glass substrate and dried at 65° C., 70° C., and 75° C. for about 20 minutes, respectively, and then at 80° C. and 130° C. for about 30 minutes, respectively, obtaining a film. The film is elongated to become white at about 280° C. at a speed of about 1%/sec in one direction. The elongated film is annealed under a nitrogen atmosphere at about 320° C. for about 7 minutes. The film is about 50 μm thick.

Comparative Example 2 to 4

Preparation of a Polyamide Random Copolymer and Film

As shown in the following Table 4, a polyamide random copolymer and a film are prepared according to the same method as Comparative Example 1 except for changing the kind and amount of the diamine and dicarboxylic acid dichloride. The films according to Comparative Examples 2 to 4 are about 50 μm to about 60 μm thick.

TABLE 4

|  | Diamine (mole) | | | | Dicarboxylic acid Dichloride (mole) | |
| --- | --- | --- | --- | --- | --- | --- |
|  | DADPS | BAPS | TFDB | BAPF | TPCl | IPCl |
| Comparative Example 1 | 0.006 | — | 0.003 | 0.001 | 0.005 | 0.005 |
| Comparative Example 2 | 0.004 | 0.003 | 0.003 | — | 0.005 | 0.005 |
| Comparative Example 3 | 0.006 | 0.003 | 0.001 | — | 0.005 | 0.005 |
| Comparative Example 4 | 0.006 | 0.002 | 0.002 | — | 0.005 | 0.005 |

Experimental Example 1

Coefficient of Thermal Expansion

The coefficient of thermal expansion ("CTE") of the films according to Examples 1 to 4 and Comparative Examples 1 to 4 are respectively is measured using a thermo-mechanical analyzer ("TMA") (5 degrees Celsius per minute ("° C./min"), pre-load: 10 millinewton ("mN"), TA Instruments TMA 2940). The results are provided in the following Tables 5 and 6.

TABLE 5

| Block copolymer | | Random copolymer | | Δ CTE of random |
| --- | --- | --- | --- | --- |
| Example | CTE (ppm/° C.) | Comparative Example | CTE (ppm/° C.) | copolymer-CTE of block copolymer |
| 1 | 15.97 | 1 | 38.18 | 22.21 |
| 4 | 15.8 | 2 | 21.32 | 5.52 |

As shown in Table 5, the block copolymer includes a repeating unit in the same ratio as a random copolymer, but has a smaller coefficient of thermal expansion ("CTE") than that of the random copolymer by about 5.52 ppm/° C. to about 22.21 ppm/° C.

TABLE 6

|  | Weight average molecular weight | | CTE |
| --- | --- | --- | --- |
|  | First segment | Second segment | (ppm/° C.) |
| Example 1 | 21,352 | 13,505 | 15.97 |
| Example 2 | 40,395 | 20,454 | 19.07 |
| Example 3 | 32,896 | 20,454 | 18.5 |

As shown in Table 6, the copolymers have various coefficients of thermal expansion ("CTE") when the length of each segment block therein, in particular, the weight average molecular weight of the segments, is changed, even though the segments include the repeating unit in the same ratio. Accordingly, the coefficient of thermal expansion ("CTE") of the block copolymer is controlled by adjusting the weight average molecular weight of each segment.

In particular, each segment with a smaller weight average molecular weight has a lower coefficient of thermal expansion ("CTE") of a copolymer.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A polyamide block copolymer comprising at least one first segment, each being the same or different and each independently comprising a structural unit represented by the following Chemical Formula 2, and a structural unit represented by the following Chemical Formula 3; and at least one second segment each being the same or different and each independently comprising a structural unit represented by the following Chemical Formula 1, and a structural unit represented by the following Chemical Formula 3:

Chemical Formula 1 wherein, in Chemical Formula 1,
$R^1$ is selected from the following chemical formulas, wherein "*" represents the point of attachment to each phenyl ring on either side of $R^1$:

$R^2$ is the same or different in each structural unit and each is independently a selected from the following chemical formulas:

wherein, in the above chemical formulas,
$R^{16}$ to $R^{27}$ are the same or different and are each independently deuterium, a halogen, a substituted or unsubstituted C1 to C10 aliphatic organic group, a substituted or unsubstituted C6 to C20 aromatic organic group, or a C1 to C2 haloalkyl group,
wherein n9 and n12 to n18 are each independently integers ranging from 0 to 4; and
n10 and n11 are each independently integers ranging from 0 to 3;
$R^3$ and $R^4$ are the same or different and are each independently a halogen, a hydroxyl group, an ether group —$OR^{200}$, wherein $R^{200}$ is a C1 to C10 aliphatic organic group, a silyl group —$SiR^{201}R^{202}R^{203}$, wherein $R^{201}$, $R^{202}$, and $R^{203}$ are the same or different and are each independently hydrogen or a C1 to C10 aliphatic organic group, a C1 to C10 aliphatic organic group, or a C6 to C20 aryl group;
n1 and n2 are each independently integers ranging from 0 to 4; and
"*" represents a point of attachment to a subsequent structural unit;

Chemical Formula 2 wherein, in Chemical Formula 2,
$R^5$ is the same as $R^2$ as defined above;
$R^6$ and $R^7$ are the same or different and are each independently —$CF_3$, —$CCl_3$, —$CBr_3$, —F, —Cl, —Br, —I, —$NO_2$, —CN, —$COCH_3$, or —$CO_2C_2H_5$;

$R^8$ and $R^9$ are the same or different and are each independently a halogen, a hydroxyl group, an ether group —$OR^{204}$, wherein $R^{204}$ is a C1 to C10 aliphatic organic group, a silyl group —$SiR^{205}R^{206}R^{207}$, wherein $R^{205}$, $R^{206}$, and $R^{207}$ are the same or different and are each independently hydrogen or a C1 to C10 aliphatic organic group, a C1 to C10 aliphatic organic group, or a C6 to C20 aryl group;
n3 is an integer ranging from 1 to 4; n5 is an integer ranging from 0 to 3;
the sum of n3 and n5 is an integer of 4 or less;
n4 is an integer ranging from 1 to 4; n6 is an integer ranging from 0 to 3;
the sum of n4 and n6 is an integer of 4 or less; and
"*" represents a point of attachment to a subsequent structural unit;

Chemical Formula 3 wherein, in Chemical Formula 3,
$R^{10}$ is the same or different in each structural unit and each is independently a silicon-containing group, a phosphorus-containing group, a sulfur-containing group, a halogen substituted C1 to C10 aliphatic organic group, a C1 to C2 haloalkyl substituted C1 to C10 aliphatic group, or an ether bond (—O—)-containing group;
$R^{11}$ is the same as $R^2$ as defined above;
$R^{12}$ and $R^{13}$ are the same or different and are each independently a single bond, a C6 to C20 aromatic organic group, a C6 to C20 aryleneoxy group, or a C6 to C20 arylene group linked via a C1 to C2 haloalkyl substituted C1 to C10 aliphatic group;
$R^{14}$ and $R^{15}$ are the same or different and are each independently a halogen, a hydroxyl group, an ether group —$OR^{208}$, wherein $R^{208}$ is a C1 to C10 aliphatic organic group, a silyl group —$SiR^{209}R^{210}R^{211}$, wherein $R^{209}$, $R^{210}$, and $R^{211}$ are the same or different and are each independently hydrogen or a C1 to C10 aliphatic organic group, a C1 to C10 aliphatic organic group, or a C6 to C20 aryl group;
n7 and n8 are each independently integers ranging from 0 to 4; and
"*" represents a point of attachment to a subsequent structural unit,
wherein the at least one first segment and the at least one second segment are not identical to each other,
wherein the at least one first segment has a weight average molecular weight of about 500 grams per mole to about 50,000 grams per mole,
wherein the at least one second segment has a weight average molecular weight of about 500 grams per mole to about 50,000 grams per mole, and
wherein the structural unit represented by the above Chemical Formula 3 comprised in the at least one second segment is comprised in an amount of more than about 60 mole % based on the entire amount of all the structural units comprised in the second segment.

2. The polyamide block copolymer of claim 1, wherein $R^{10}$ is —$SO_2$—, —O—, —$C(CF_3)_2$—, —$C(CCl_3)_2$—, —$C(CBr_3)_2$—, —$CF_2$—, —$CCl_2$—, or —$CBr_2$—.

3. The polyamide block copolymer of claim 1, wherein $R^{12}$ and $R^{13}$ are the same or different and are each independently a single bond, -Ph-, —O-Ph-, or —C(CF$_3$)$_2$-Ph-, wherein Ph is a phenylene group.

4. The polyamide block copolymer of claim 1, wherein $R^2$, $R^5$, and $R^{11}$ are the same or different and are each independently selected from the following chemical formulas:

5. The polyamide block copolymer of claim 1, wherein the structural unit represented by the above Chemical Formula 3 comprised in the at least one first segment is comprised in an amount of 60 mole % or less based on the entire amount of the structural units comprised in the first segment.

6. The polyamide block copolymer of claim 1, wherein the polyamide block copolymer comprises the at least one first segment and the at least one second segment in a weight ratio ranging from about 1:99 to about 60:40.

7. The polyamide block copolymer of claim 6, wherein the polyamide block copolymer comprises the at least one first segment and the at least one second segment in a weight ratio ranging from about 10:90 to about 40:60.

8. The polyamide block copolymer of claim 1, wherein the polyamide block copolymer has transmittance of about 80% or more of light at a wavelength ranging from about 400 nanometers to about 750 nanometers.

9. The polyamide block copolymer of claim 1, wherein the polyamide block copolymer has transmittance of about 60% or more of light at a wavelength of about 400 nanometers.

10. An article comprising a polyamide block copolymer according to claim 1.

11. The article of claim 10, wherein the article is a film, a fiber, a coating material, or an adhesive.

12. The article of claim 10, wherein the article has a coefficient of thermal expansion of about 20 parts per million per degrees Celsius or lower.

13. A display device comprising an article according to claim 10.

* * * * *